(12) United States Patent
Lenosky

(10) Patent No.: US 6,999,679 B2
(45) Date of Patent: Feb. 14, 2006

(54) CANCELLATION OF OPTICAL SIGNAL REFLECTIONS IN BI-DIRECTIONAL OPTICAL FIBERS

(75) Inventor: Thomas Lenosky, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 115 days.

(21) Appl. No.: 10/683,908

(22) Filed: Oct. 10, 2003

(65) Prior Publication Data

US 2005/0078963 A1    Apr. 14, 2005

(51) Int. Cl.
*H04B 10/12*    (2006.01)

(52) U.S. Cl. .......................... 398/21; 398/28; 398/136; 398/139

(58) Field of Classification Search ................. 398/21, 398/28, 29, 41–42, 136–137, 139
See application file for complete search history.

(56) References Cited

U.S. PATENT DOCUMENTS

| | | | | |
|---|---|---|---|---|
| 4,301,543 A | * | 11/1981 | Palmer | ......................... 398/41 |
| 6,441,937 B1 | * | 8/2002 | Baur et al. | .................. 398/135 |

* cited by examiner

*Primary Examiner*—Leslie Pascal
(74) *Attorney, Agent, or Firm*—Workman Nydegger

(57) ABSTRACT

Signal reflection mitigation in fiber-optic networks. Signal reflections are mitigated using near-end echo cancellation, threshold adjustment and/or error correction code. Signal reflections in a receive signal that are caused by near-end connectors may be mitigated using an echo cancellation signal. Signal reflections caused by other discontinuities on a fiber-optic network may be mitigated by using error correction code. Also, an average value of a reflected signal maybe detected and used to set an adjusted threshold value to interpret logical values of an electronic or optical signal.

23 Claims, 5 Drawing Sheets

CANCELLATION OF OPTICAL SIGNAL REFLECTIONS IN BI-DIRECTIONAL OPTICAL FIBERS

BACKGROUND OF THE INVENTION

1. The Field of the Invention

The invention generally relates to improving communications in an optical fiber. More specifically, the invention relates to counteracting the effects of echoes caused by discontinuities in fiber-optic networks.

2. Description of the Related Art

In the field of data transmission, one method of efficiently transporting data is through the use of fiber-optics. Digital data is propagated through an optical fiber using light emitting diodes or lasers. Light signals allow for high transmission rates and high bandwidth capabilities. Also, light signals are resistant to electro-magnetic interferences that would otherwise interfere with electrical signals. Optical fibers do not typically allow portions of the light signal to escape from the optical fiber as can occur with electrical signals in wire-based systems.

In a typical fiber-optic network, the transmission and reception of data is not strictly limited to optical signals. Digital devices such as computers may communicate using both electronic and optical signals. As a result, optical signals need to be converted to electronic signals and electrical signals need to be converted to optical signals. To convert electronic signals to optical signals for transmission on an optical fiber, a transmitting optical subassembly (TOSA) is often used. A TOSA uses a electronic signal to drive a laser diode or light emitting diode to generate an optical signal. When optical signals are converted to electronic signals, a receiving optical subassembly (ROSA) is used. The ROSA has a photo diode that, in conjunction with other circuitry, converts the optical signals to electronic signals.

Because most computers and other digital devices both transmit and receive signals, most computers need both a TOSA and a ROSA to communicate through optical fibers. A TOSA and ROSA can be combined into an assembly generally referred to as a transceiver. Accordingly, most computers in a fiber-optic network are configured to communicate in a bidirectional nature, meaning that they can both transmit and receive signals on the fiber-optic network.

One method of achieving bidirectional communication is through the use of two optical fibers. The first fiber can be used to transmit optical signals and the second fiber can be used to receive optical signals. It is often desirable to limit the number of optical fibers between two communication points to save on material costs and installation. The number of fibers in an optical network can be limited by both sending and receiving signals on the same optical fiber, which is possible because of the directional nature of an optical signal that is propagated along an optical fiber.

Various challenges arise when transmitting signals in both directions along a single optical fiber. For example, while generally bidirectional fiber-optic communication is achievable because of the directional nature of the fiber-optic signals, a transmitted signal that is reflected by some discontinuities or irregularities in the fiber-optic network can results in a portion of a signal being reflected. This reflected signal might then be interpreted by the transceiver that sent the signal as a portion of a received signal.

Reflected signals add noise to the signal that is received by the transceiver. Additional noise in the received signal reduces the signal to noise ratio (SNR) which is a measure of signal quality. The SNR is used to calculate the bit error rate (BER), which is a rate at which errors occur when signals are interpreted. In one exemplary fiber-optic communication standard, the 10 Gigabit Ethernet standard, the BER that is within the acceptable limits defined by the standard is $10^{-12}$, or about 1 error in 1,000,000,000,000 bits. To any extent that reflected signals cause a BER greater than that allowed by the standard in which the signal operates, those reflected signals should be mitigated such that the total BER falls within the acceptable limits defined by the standard.

One method of dealing with these reflected signals is to use echo cancellation. Echo cancellation essentially counteracts, at the transceiver, any reflected signal with a canceling signal such as one that is equal but opposite in magnitude to the reflected signal. Echo cancellation has not been widely used because it is expensive in terms of computing resources to implement. For example, to generate the canceling signal, information should be known about discontinuities on the fiber-optic network in terms of what sorts of reflections these discontinuities cause. Namely, to cause the echo cancellation signal to be generated at the appropriate time, the designer of an echo cancellation configuration should know the amount of time for a signal to reach the discontinuity, to be reflected by the discontinuity and to return to the transceiver. Further, for the echo cancellation signals to be of the proper magnitude, the designer of an echo cancellation configuration should know what percentage of a signal will be reflected back to the transceiver. The data transmitted on the network is used to create the canceling signal for data that is reflected. Thus, any data transmitted on the network should be maintained or remembered for an amount of time equal to the time for the signal to travel to the discontinuity, to be reflected by the discontinuity and to return to the transceiver. Further, information may have to be stored regarding any discontinuities that exist throughout the entire fiber-optic network that causes signals to be reflected to the transceiver.

One conventional method of bidirectional communication along a single optical fiber that addresses reflection challenges involves the use of lasers with different wavelengths. In a bidirectional communication configuration, one laser wavelength (e.g. 1550 nm) is used to transmit signals in one direction, while a second wavelength (e.g. 1310 nm) is used to transmit signals in the opposite direction. Thus, any reflected signals can be filtered out by an appropriate bandpass filter that is configured to only allow a certain band of frequencies to pass through or a notch filter that is configured to allow a very narrow band of frequencies to pass through. A receiver configured to detect transmissions from a 1310 nm laser, for example, filters out reflections at 1550 nm, and vice versa.

One drawback with this configuration is that it requires two types of transceivers that are complementary with different transceivers being used at the two communications devices that are engaging in the bidirectional communication. For example, one of the two communications devices should have a transceiver with a 1550 nm transmitter and a 1310 nm receiver. In contrast, the other of the two communications devices should have a complementary transceiver having a 1310 nanometer transmitter and a 1550 nanometer receiver. Requiring two types of transceivers increases production and maintenance costs. In addition, these types of receivers can lead to communication problems due to incompatibility. In other words, a device with a 1310 nm receiver can only receive data from devices that transmit data using a 1310 nm laser.

BRIEF SUMMARY OF THE INVENTION

These and other limitations are overcome by the present invention, which relates to systems and methods for mitigating reflections in bi-directional communication. One embodiment of a method of mitigating effects of reflections of an optical signal includes using both error correction code and echo cancellation. After receiving an optical signal that includes error correction code, the optical signal is converted into an electronic signal. A portion of the electronic signal that corresponds to near-end reflections is cancelled from the electronic signal. Errors are detected in the electronic signal by performing mathematical manipulations of the electronic signal using the error correction code. Errors may be corrected by performing mathematical manipulations of the electronic signal using the error correction code.

In another embodiment the invention, the effects of reflections of an optical signal are mitigated using near-end echo cancellation and threshold adjustment. A received optical signal is converted into an electronic signal. A first portion of the electronic signal caused by a first reflection of the optical signal that is caused by the optical signal interacting with a connector is cancelled. The average magnitude of a second portion of the electronic signal caused by reflections of the optical signal by other discontinuities located further away than the connector is detected and an corresponding adjustment is made to the threshold level. The electronic signal is interpreted as a logical "1" if the electronic signal is at an adjusted threshold level.

One embodiment of the invention mitigates reflections in fiber-optic networks while conserving memory resources needed on digital devices connected to the fiber-optic networks by mitigating reflections caused by discontinuities located further away than a near-end connector by methods other than memory intensive echo cancellation for far end reflections. In addition, the number of errors caused by reflections in fiber-optic networks is reduced. These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Embodiments of the present invention mitigate the effect of reflected signals in optical networks. Embodiments of the present invention mitigate signal reflections, for example, using echo cancellation including near-end echo cancellation, error code correction, threshold adjustment, and combinations thereof. Near-end echo cancellation can be used to mitigate signal reflections caused by discontinuities that are close to the receiver. This reduces the data that would otherwise have to be maintained for full echo cancellation. In some embodiments, signal reflections or echoes caused by other discontinuities can be mitigated by using error correction codes or by adjusting the logical threshold values according to the average value of signals on the fiber-optic network.

Figure 1:
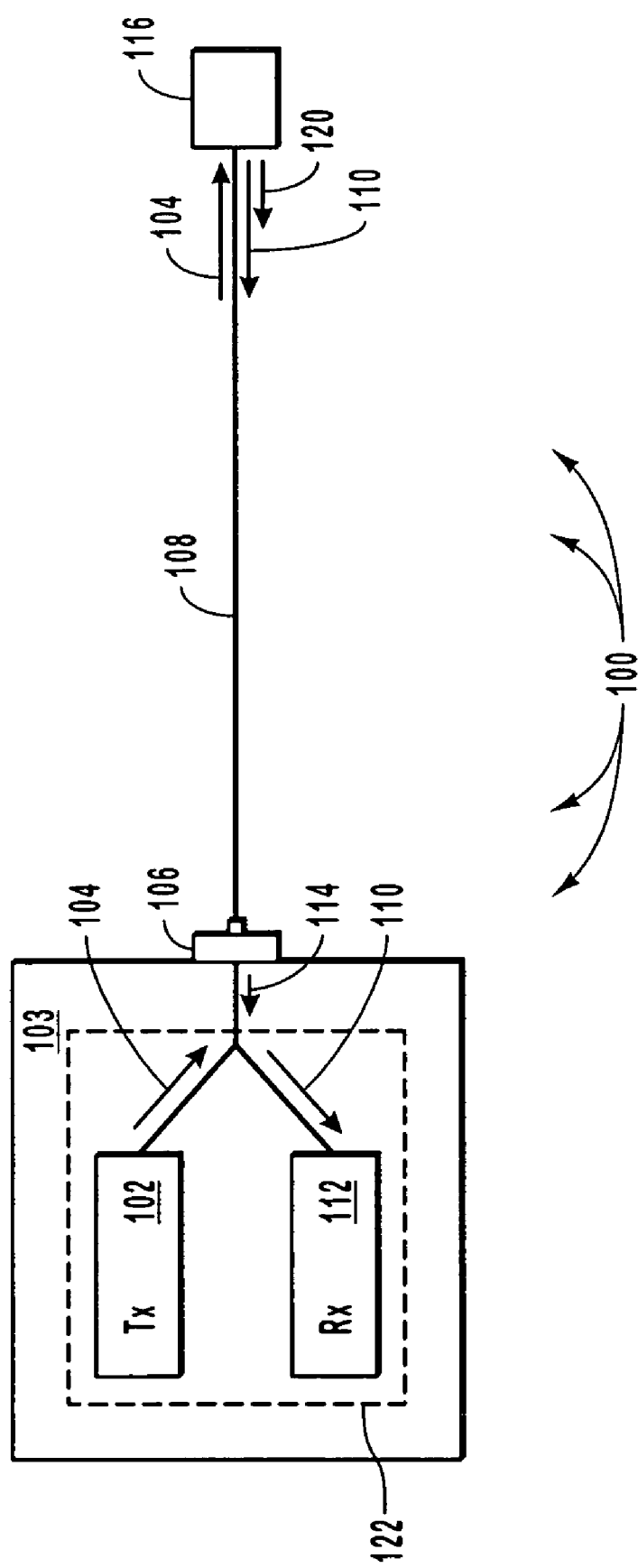
FIG. 1 illustrates a fiber-optic network where certain aspects of the present invention may be practiced.

Referring now to FIG. 1, an exemplary environment where embodiments of the present invention may be practiced is shown as a network 100. A transmitter optical subassembly (TOSA) 102, that is part of a digital device 103, transmits a transmit signal 104 through a local connector 106 onto an optical fiber 108. The transmit signal 104 travels on the optical fiber 108 to other devices on the fiber-optic network. Simultaneously, a receive signal 110 travels along the optical fiber 108 towards the digital device 103. The receive signal 110 travels through the local connector 106 to a receive optical subassembly (ROSA) 112 that is a part of the digital device 103. The digital device 103 may be a computer configured to operate on a fiber-optic network or any other suitable fiber-optic enabled device.

As the transmit signal 104 interacts with the local connector 106, a near-end reflection 114 is caused and may be reflected back into the ROSA 112. Reflections such as near-end reflection 114 are generally caused by light in a medium of one index of refraction encountering a medium with a different index of refraction. The transmit signal 104 propagated onto the optical fiber 108 may contact a discontinuity 116. Discontinuity 116 may be a far end connector, a bend in the optical fiber, or some other reflection causing element of the fiber-optic network. When the transmit signal 104 contacts the discontinuity 116, a far end reflection 120 is caused. The far end reflection 120 may travel along the optical fiber 108 and be received by the ROSA 112. While in this example the far end reflection 120 is shown as a single reflection, in many environments a number of discontinuities in the fiber-optic network may cause numerous reflections to be reflected back to the digital device 103.

In one embodiment of the invention the effects of the near-end reflection 114 are mitigated using echo cancellation signals while other reflections such as far end reflection 120 are mitigated using other instrumentalities. By canceling other reflections by methods other than echo cancellation, memory used to store the signal used in echo cancellation can be optimized because the signal does not need to be stored as long. Further, information about far end discontinuities does not need to be stored. The echo cancellation signal for mitigating the near-end reflection 114 may be generated by the digital device 103 or by circuitry in a transceiver 122 that includes the TOSA 102 and ROSA 112.

Because the echo cancellation signal is generated for echoes or signal reflections that occur, for example, near the ROSA 112 (i.e., at the connector 106), information about the transmit signal 104 may be maintained for a relatively short period of time, i.e. the amount of time for the transmit signal 104 to be transmitted to the connector 106, reflected by the connector 106 and returned to the transceiver 122. This reduces the resources that would otherwise be needed to perform echo cancellation. Additionally, because the connector 106 may be included as a part of the transceiver 122, the amount of optical signal reflected by the connector 106 may be known such that designing circuitry to generate an echo cancellation signal may be simplified.

Figure 2:
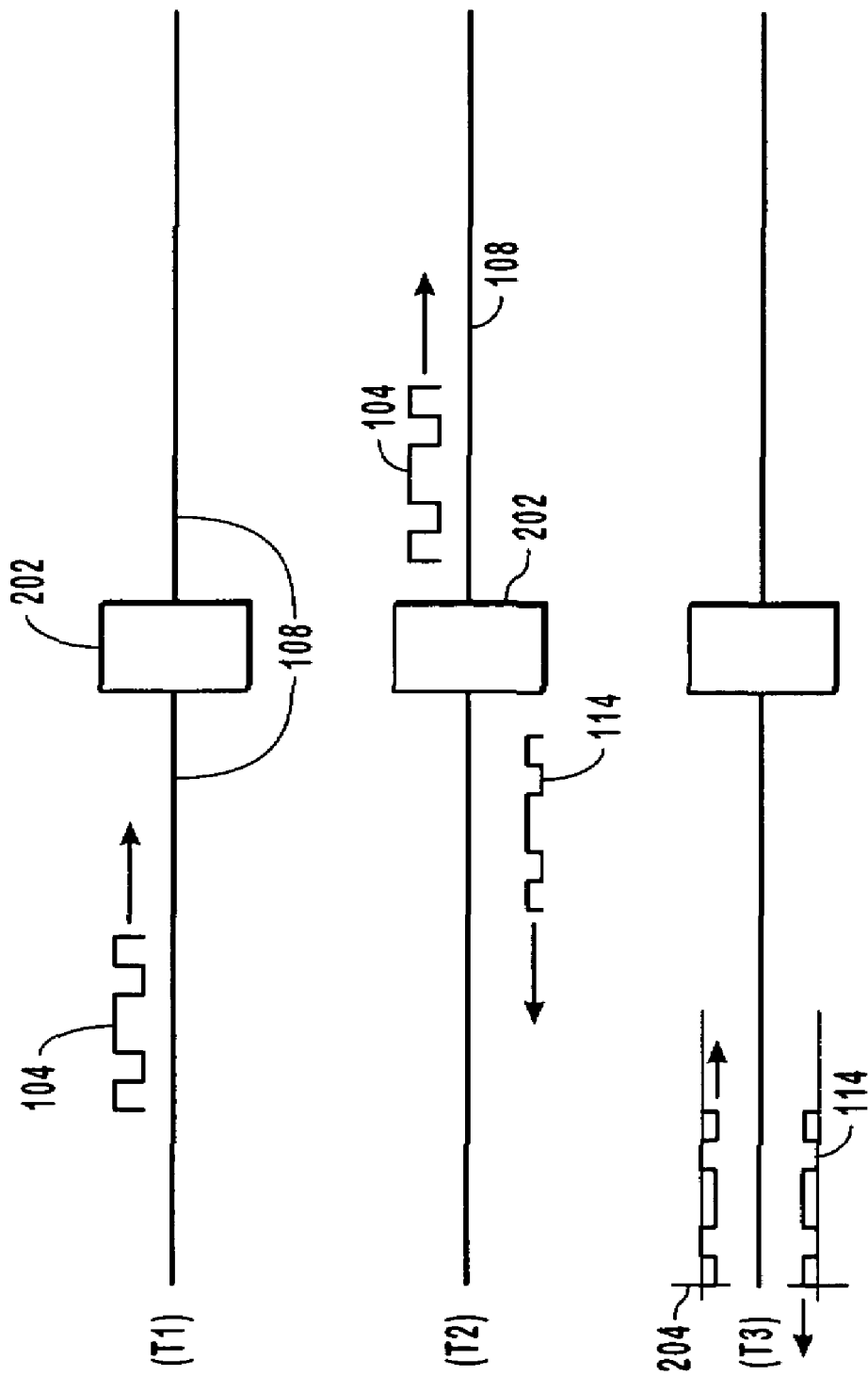
FIG. 2 illustrates a time-wise depiction of echo cancellation as implemented in certain embodiments of the present invention

FIG. 2 illustrates one example of near-end echo cancellation. Embodiments of the present invention cancel near-end reflections such as the reflections caused by discontinuities that are near the digital device. A connector that connects a transceiver with a bi-directional fiber optic is an example of a near-end discontinuity. The transceiver or other digital device only needs to remember information about transmit signals up to the near-end discontinuities.

FIG. 2 illustrates a time wise progression of the transmit signal 104 traveling on an optical fiber 108. As shown at time T1, the transmit signal 104 travels towards a near-end discontinuity 202 that may be a connector such as connector 106 as previously mentioned. As the transmit signal 104 interacts with the discontinuity 202 a portion of the transmit signal 104 continues to travel on the optical fiber 108 while a near-end reflection 114 is reflected away from the transmit signal 104 as shown at time T2.

The optical signal detected by the digital device (such as a detector in a transceiver) includes a receive signal and a reflected signal. The receive signal corresponds to the signal that is intended for the device and the reflected signal corresponds, for example, to noise or to reflections of transmit signals. The reflected signal included in the optical signal can also be represented as having a first portion that corresponds to near-end reflections and a second portion that corresponds to other reflections including, but not limited to, noise and far-end reflections.

At an appropriate time, shown in time T3, an echo cancellation signal 204 is generated to cancel the near-end reflection 114. Alternatively, appropriate digital signal processing may be performed on the near-end reflection 114 to cancel the near-end reflection 114. The echo cancellation signal 204 may be generated at any convenient time and location such as after the optical signal has been converted to an electronic signal in a transceiver such as transceiver 122.

Figure 3:
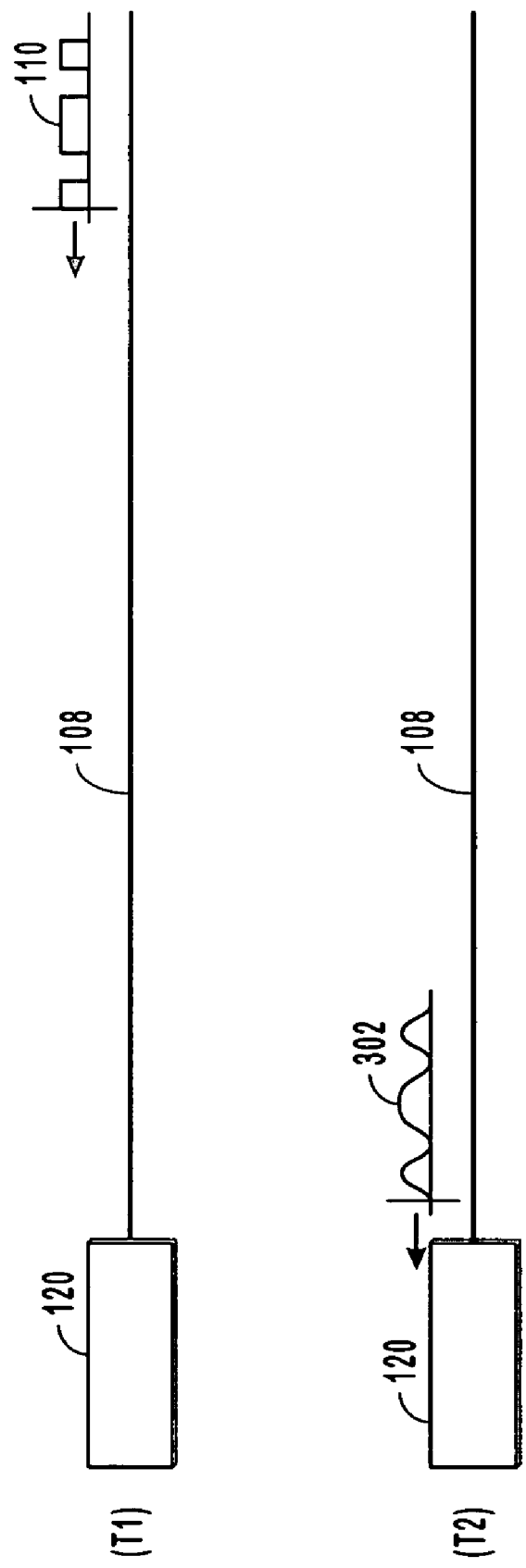
FIG. 3 illustrates a time wise depiction of distortion that may occur in a fiber-optic network
Figure 4:
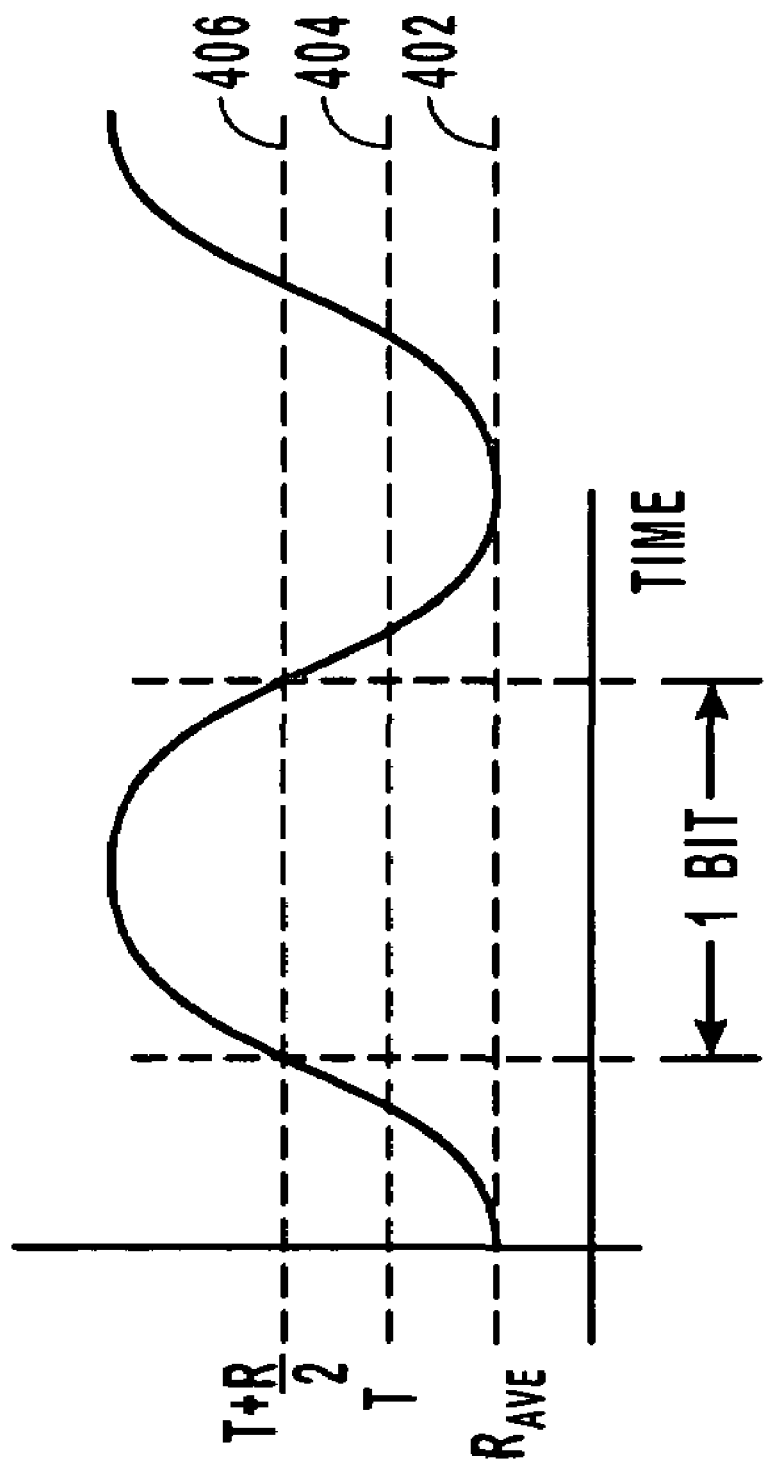
FIG. 4 illustrates a graph of threshold voltages used for interpreting the logical value of a signal in certain embodiments of the invention.

By canceling the near-end reflection 114 using an echo cancellation signal or by signal processing, the far end reflection 120, if necessary, can be mitigated by other methods. Referring now to FIGS. 3 and 4, the effects of far end reflected signals on a receive signal 110 is shown. Notably, the methods shown in FIGS. 3 and 4 may also be used to cancel near-end reflections. Particularly, FIG. 4 shows one embodiment of a method for mitigating the effects of the reflected signals. FIG. 3 shows a receive signal 110 that travels along an optical fiber 108 towards a transceiver 122. As the receive signal 110 travels along the optical fiber the receive signal is distorted as well as being biased by a far end reflected signal as shown at time T2 in FIG. 3. The distorted and biased signal is shown as a distorted receive signal 302.

A ROSA such as ROSA 112, and more particularly the photo diode in conjunction with other circuitry in the ROSA, converts optical signals into voltages that may be interpreted as electronic signals. The voltages are related to the optical signals such that if a distorted optical signal is received by the photo diode in the ROSA, a distorted electronic signal is generated. Thus, an electronic signal generated from an optical signal that is distorted and biased will also be distorted and biased.

FIG. 4 illustrates over the time frame of one bit, the various voltage levels associated with the distorted receive signal 302. FIG. 4 shows an average far end reflected signal 402, a threshold signal 404 and a voltage level that is the combination of a threshold voltage and an average far end reflected signal voltage, namely, an adjusted threshold voltage 406.

The high threshold signal 404 represents a voltage level in a transceiver where a signal is interpreted as a logical "1". If the signal is biased, such as by an average far end reflected signal 402, a signal that is intended to represent a logical "0" may be interpreted as a logical "1". In one embodiment of the invention, to counteract this effect, the threshold for a logical "1" is raised from the high threshold signal 404 to an adjusted threshold 406. Thus, a signal with no bias that is at a level of the high threshold signal 404 will have the same interpretation as a signal with an average far end reflected signal bias with an adjusted threshold voltage 406 that is equal to the high threshold signal 404 plus the average far end reflected signal 402.

Several methods may be used to determine the average far end reflected signal 402. For example, a peak far end reflected signal may be detected. The average far end reflected signal will be ½ of the peak reflected signal. Alternatively, the reflected signal may be monitored and averaged over time to generate an average reflected signal 402.

Figure 5:
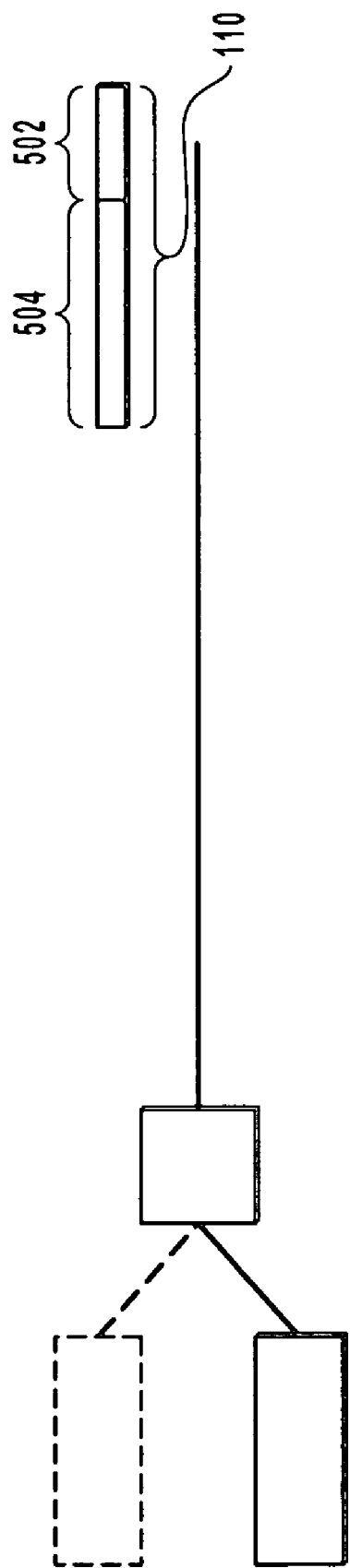
FIG. 5 illustrates the use of error correction code as implemented in certain embodiments of the present invention.

Another method of counteracting the effects of far end reflections is shown in FIG. 5. FIG. 5 illustrates a method of sending error correction code (ECC) 502 along with the data portion 504 of the receive signal 110. ECC 502 is extra bits sent along with data that represent a calculated code that can be used when data is received to detect errors in the receive signal 110 and to correct errors by performing mathematical manipulations on the data portion 504 and the ECC 502. ECC may also be referred to as hamming code. Exemplary embodiments of ECC include Reed-Solomon codes. In 10 Gigabit Ethernet applications, while a BER of $10^{-12}$ can be achieved when the SNR is 17 dB, using ECC, a BER of $10^{-12}$ can be achieved with a lower SNR such as 11 dB.

Thus embodiments of the present invention may mitigate near-end reflections using echo cancellation while mitigating the effects of far end reflections by adjusting the signal interpretation thresholds or through the use of error correction coding. The invention however is not limited to this configuration. For example, near-end reflections may also be mitigated by adjusting the signal interpretation thresholds or through the use of error correction coding. Far end reflections may also be mitigated by using some form of echo cancellation as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for mitigating the effects of reflections of an optical signal in a fiber used for bi-directional communication, the method comprising:

detecting an optical signal that is received over an optical fiber by a transceiver, wherein the optical signal includes a receive signal and a reflected signal;

maintaining information that corresponds to a transmit signal transmitted by the transceiver over the optical fiber to near-end discontinuities;

canceling a first portion of the reflected signal that corresponds to near-end reflections of the transmit signal caused by the near-end discontinuities;

detecting errors in the optical signal using the error correction code; and correcting the errors using the error correction code.

2. The method of claim 1, wherein the near-end discontinuities include a connector of the transceiver, further comprising maintaining information that corresponds to the transmit signal up to the connector.

3. The method of claim 1, wherein detecting an optical signal that is received over an optical fiber by a transceiver further comprises converting the optical signal to an electronic signal.

4. A method for mitigating the effects of reflections of an optical signal in a fiber used for bi-directional communication, the method comprising:

detecting an optical signal that is received over an optical fiber by a transceiver, wherein the optical signal includes a receive signal and a reflected signal;

maintaining information that corresponds to a transmit signal transmitted by the transceiver over the optical fiber to near-end discontinuities;

canceling a first portion of the reflected signal that corresponds to near-end reflections of the transmit signal caused by the near-end discontinuities;

determining an average bias of a second portion of the reflected signal; and adjusting a threshold detection level to an adjusted threshold level based on the average bias.

5. The method of claim 4, wherein adjusting a threshold level to an adjusted threshold level based on the average bias further comprises adjusting the threshold detection level by one-half of the average bias.

6. In a digital device deployed in a fiber-optic network, a method for mitigating the effects of reflections of an optical signal, the method comprising:

receiving an optical signal that includes a receive signal and a reflected signal;

converting the optical signal to an electronic signal;

canceling a portion of the reflected signal that is generated by a near-end discontinuity near the digital device from the electronic signal; and correcting errors, if any, in the electronic signal using an error correction code included in the receive signal.

7. The method of claim 6, wherein canceling a portion of the reflected signal that is generated by a near-end discontinuity near the digital device from the electronic signal further comprises generating an echo cancellation signal.

8. The method of claim 7, the echo cancellation signal being equal but opposite in magnitude to the portion of the reflected signal that is generated by a near-end discontinuity.

9. The method of claim 7, wherein canceling a portion of the reflected signal that is generated by a near-end discontinuity near the digital device from the electronic signal further comprises maintaining information about a transmit signal, the echo cancellation signal being generated from the maintained information.

10. The method of claim 9, wherein maintaining information about a transmit signal further comprises maintaining information about an amount of reflection caused by the near-end reflection near the digital device, the echo cancellation signal being generated from the information about the amount of reflection caused by the connector near the digital device.

11. The method of claim 6, wherein the digital device further comprises a transceiver, further comprising canceling a portion of the reflected signal by the transceiver.

12. The method of claim 11, wherein the near-end discontinuity includes a connector of the transceiver, further comprising canceling a portion of the reflected signal, the portion of the reflected signal comprising a reflection of a transmit signal from the connector.

13. The method of claim 6, further comprising adjusting a threshold used to interpret the electronic signal.

14. The method of claim 13, further comprising adjusting a threshold used to interpret the electronic signal to account for far-end reflections that are included in the reflected signal.

15. In a digital device deployed in a fiber-optic network, a method of mitigating the effects of reflections included in an optical signal, the method comprising:

receiving an optical signal that includes a receive signal and a reflected signal;

converting the optical signal to an electronic signal;

canceling a first portion of the reflected signal, wherein the first portion of the reflected signal is caused by a first reflection of a transmit signal caused by the transmit signal interacting with a connector near the digital device;

detecting an average magnitude of a second portion of the reflected signal that is caused by a second reflection of the optical signal, the second reflection being caused by discontinuities located at a distance further from the digital device than the connector;

adjusting a threshold level to an adjusted threshold level, the adjusted threshold-level including at least a portion of the average magnitude of the second portion of the reflected signal; and interpreting the electronic signal as a logical "1" if the electronic signal is at or above an adjusted threshold level.

16. The method of claim 15, wherein canceling a first portion of the reflected signal further comprises generating an echo cancellation signal.

17. The method of claim 16, further comprising generating the echo cancellation signal such that the echo cancellation is equal but opposite in magnitude to the first portion of the reflected signal included in the electronic signal.

18. The method of claim 16, further comprising:
maintaining information about a portion transmit signal; and
generating the echo cancellation signal from the information.

19. The method of claim 16, further comprising:
maintaining information about an amount of reflection caused by the connector near the digital device; and
generating the echo cancellation signal from the information about the amount of reflection caused by the connector near the digital device.

20. The method of claim 15, further comprising:
detecting an average magnitude of the second portion of the reflected signal by:
detecting the peak value of the second portion of the reflected signal; and
calculating an average magnitude of the second portion of the reflected signal as ½ of the peak value.

21. The method of claim 15, wherein detecting an average magnitude of a second portion of the reflected signal that is caused by a second reflection of the optical signal further comprises time averaging the magnitude of the second portion of the reflected signal.

22. The method of claim 15, the optical signal including error correction code, the method further comprising:

detecting errors by performing mathematical manipulations of the electronic signal utilizing the error correction code; and correcting any errors by performing mathematical manipulations of the electronic signal utilizing the error correction code.

23. In a digital device deployed in a fiber-optic network, a method of mitigating the effects of reflections included in an optical signal wherein the optical signal includes error correction code, the method comprising:

receiving an optical signal that includes a receive signal and a reflected signal;

converting the optical signal to an electronic signal;

detecting an average magnitude of a portion of the reflected signal that is caused by a reflection of the optical signal;

adjusting a threshold level to an adjusted threshold level, the adjusted threshold level including at least a portion of the average magnitude of the reflected signal;

interpreting the electronic signal as a logical "1" if the electronic signal is at or above an adjusted threshold level;

detecting errors in the electrical signal using the error correction code; and correcting the errors using the error correction code.

* * * * *